Apr. 10, 1923.
J. A. LE BLANC
1,451,074
NONSKIDDING TIRE SHOE
Filed Mar. 15, 1922
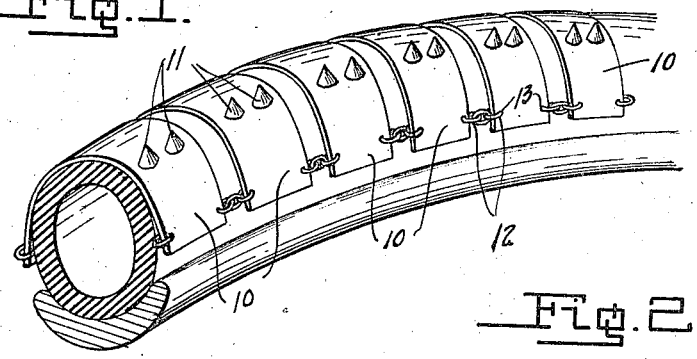
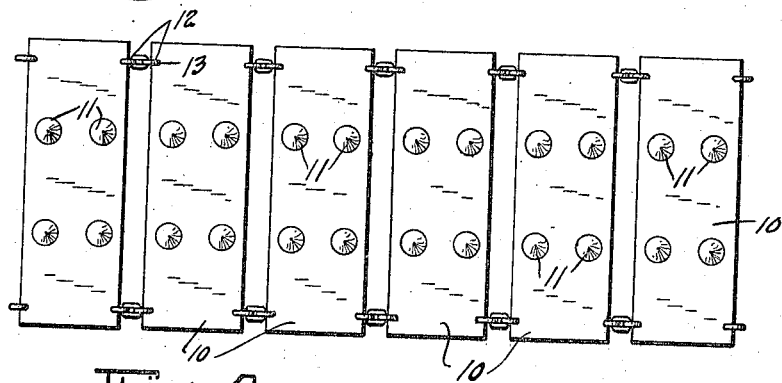
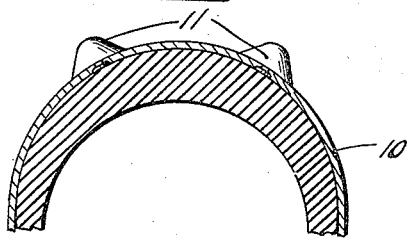
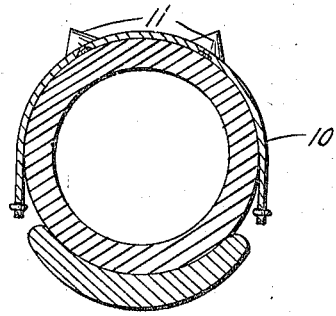
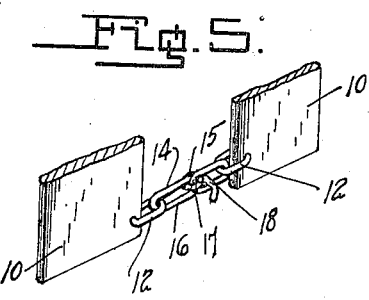
Inventor
Joseph A. LeBlanc
By Watson E. Coleman
Attorney Patented Apr. 10, 1923.

1,451,074

UNITED STATES PATENT OFFICE.

JOSEPH ARTHUR LE BLANC, OF SALEM, MASSACHUSETTS.

NONSKIDDING TIRE SHOE.

Application filed March 15, 1922. Serial No. 543,943.

*To all whom it may concern:*

Be it known that I, JOSEPH ARTHUR LE BLANC, a citizen of the United States, residing at Salem, in the county of Essex and State of Massachusetts, have invented certain new and useful Improvements in Nonskidding Tire Shoes, of which the following is a specification, reference being had to the accompanying drawings.

This invention relates to tire shoes, and the object of the invention is to provide a simple, effective tire shoe for bicycle or automobile tires, which is particularly adapted to prevent skidding.

A further object is to provide a tire shoe of this character which will not wear the tire, which will conform to the tire, will have a certain degree of yielding action, and which may be readily applied and removed.

My invention is illustrated in the accompanying drawings, wherein:—

Figure 1 is a fragmentary perspective view of a bicycle tire with my non-skid shoe applied to the tire;

Figure 2 is an outside face view of the plates 10 of the shoe, the view showing the plates 10 as if they were flat in order to avoid confusion;

Figure 3 is a sectional view of the tire showing one of the plates in position thereon;

Figure 4 is a fragmentary transverse sectional view of an automobile tire with my shoe applied thereto;

Figure 5 is a fragmentary perspective view of two of the plates 10 showing the detachable connection between the end plates.

Referring to these drawings, it will be seen that my improved non-skidding shoe comprises a series of transversely extending plates 10, which in practice will be about 2" in length and have a width depending upon the size of the tire with which the device is to be used, these plates being transversely curved so as to fit against the tire, as illustrated in Figure 1, and being of such width that the ends of the plates, when the shoe is in place, extend beyond the middle of the tire, that is beyond the diametrical plane, yet not come in contact with the rim. These plates are provided with studs 11 projecting therefrom, the studs having overturned shanks disposed in countersunk holes on the inside face of each strip 10. Thus the inner ends of these rivets or shanks will not injure or bear upon the face of the tire. There may be any number of these studs 11, but I have illustrated them as four in number disposed in rows circumferentially of the tire, and on each side of the middle plane thereof. Where these studs are to be used for bicycle tires, the studs are pointed, but where the shoe is to be used for automobile tires, (as in Figure 4) the studs are more rounded at the extremities, inasmuch as the heavy weight of the automobiles would tend to force them unduly into the roads and to tear them up.

The transversely curved plates 10 are adapted to be flexibly connected to each other by means of links. Any number of links may be used between the plates. Preferably, however, the plates will be set about ¼" apart more or less. I have illustrated in Figure 1 two links 12 which engage with each other and are engaged with the plates at 13. The plates are all connected to each other by these links, except that the plates forming the ends of the shoe have detachable linked engagement. Thus, as illustrated in Figure 5, the plate at one end of the shoe is provided with the link 12, but the plate at the opposite end of the shoe has attached to its link 12 a link 14 formed with an eye 15 surrounding the material of the link 12, this link 14 beyond the eye being outwardly curved, then extended longitudinally, as at 16, then inwardly bent, as at 17, and then outwardly bent, as at 18. This link 14 may be passed around the link 12, then returned to the opposite link 12, and a hook 18 hooked over this link 12, as shown in Figure 5, thus connecting the shoe upon the tire and preventing any accidental removal thereof.

The side edges of the plates 10 should be slightly rounded. In other words, the corners should be rounded so as to prevent the plates from cutting into the tire, and in actual practice the complete shoe will be made up of sections which consist of a plurality of plates 10, the sections being connected to each other by the detachable links shown in Figure 5 so that the shoe may be put upon the tire in sections and removed from the tire in sections and transported in sections.

It will be seen that with this device there are no chains which are disposed in such position upon the tire as to wear or score the same. The tire seats upon a series of curved plates which conform to the tire and which will not cut or wear the tire, these plates having the non-skidding studs projecting therefrom, which in actual practice I have found will hold the tire from any side slip and are particularly valuable when the automobile or bicycle is running over snow, ice, mud or more or less slippery roadways. The device is very easily attached around a wheel and may be cheaply made. It not only acts to prevent skidding but to a great extent protects the tire.

I claim:—

A non-skidding shoe for pneumatic tires comprising a series of transversely curved, rectangular plates spaced from each other throughout their entire length, the forward and rear edges of the plates being parallel to each other, the opposite ends of each plate extending tangential to the curved middle portion of the plate and the plates having a width such that when in place upon a tire they will extend beyond the largest diameter thereof, chain links connecting the like ends of the plates to each other, and a detachable link connecting the end plates of the shoe.

In testimony whereof I hereunto affix my signature.

JOSEPH ARTHUR LE BLANC.